United States Patent

Arai et al.

Patent Number: 5,812,210
Date of Patent: Sep. 22, 1998

[54] DISPLAY APPARATUS

[75] Inventors: Ikuya Arai, Yokohama; Kouji Kitou, Hiratsuka; Masahiro Eto, Mobara; Ryuuichi Someya, Fujisawa; Kiyoharu Kishimoto, Yokohama, all of Japan

[73] Assignee: Hitachi, Ltd., Tokyo, Japan

[21] Appl. No.: 381,491

[22] Filed: Jan. 31, 1995

[30] Foreign Application Priority Data

Feb. 1, 1994 [JP] Japan ................................ 6-010409

[51] Int. Cl.$^6$ ................ H04N 7/01; H04N 11/20; H04N 5/46
[52] U.S. Cl. .................... 348/555; 348/441; 348/458; 348/543
[58] Field of Search .................... 348/441, 443, 348/444, 445, 446, 448, 449, 450–452, 458, 459, 554–558, 543; H04N 7/01, 11/20, 5/46

[56] References Cited

U.S. PATENT DOCUMENTS

| 4,574,279 | 3/1986 | Roberts | 348/443 |
| 4,831,441 | 5/1989 | Ando | 348/441 |
| 4,922,118 | 5/1990 | Maeshima | 348/458 |
| 4,956,707 | 9/1990 | Oakley et al. | 348/441 |
| 5,229,853 | 7/1993 | Myers . | |
| 5,331,346 | 7/1994 | Shields et al. | 348/441 |

FOREIGN PATENT DOCUMENTS

| 53-57914 | 5/1978 | Japan . |
| 3-73994 | 3/1991 | Japan . |
| 6-138834 | 5/1994 | Japan . |
| 61100078 | 1/1995 | Japan . |

Primary Examiner—Michael H. Lee
Attorney, Agent, or Firm—Antonelli, Terry, Stout & Kraus, LLP

[57] ABSTRACT

A display apparatus capable of receiving and displaying video signals which differ in scanning frequencies or resolutions. The display apparatus includes an input section for receiving at least one video signal and a conversion unit for converting at least one of the frequency and resolution of the at least one received video signal so as to be within predetermined higher ranges thereof. A display unit enables display of the converted received at least one video signal.

32 Claims, 15 Drawing Sheets

FIG. 3(A)

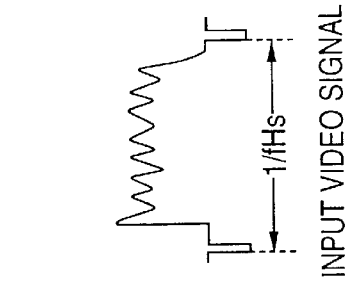

INPUT VIDEO SIGNAL

HORIZONTAL SCANNING FREQUENCY: fHs

VERTICAL SCANNING FREQUENCY: fVs

SAMPLING 2048×fHs →

FIG. 3(B)

2048 PIECES OF DATA fHs/fVs LINES

VIDEO MEMORY CONTENTS

HORIZONTAL DATA LENGTH: FIXED

VERTICAL DATA LENGTH: VARIABLE

INTER- POLATION →

FIG. 3(C)

2048 PIECES OF DATA fHp/fVs LINES

VERTICAL INTERPOLATION PROCESS

READOUT 2048×fHp →

FIG. 3(D)

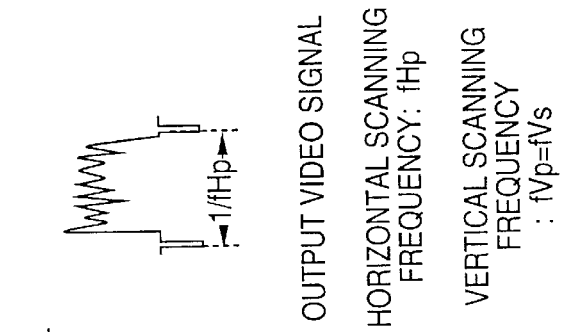

OUTPUT VIDEO SIGNAL

HORIZONTAL SCANNING FREQUENCY: fHp

VERTICAL SCANNING FREQUENCY: fVp=fVs

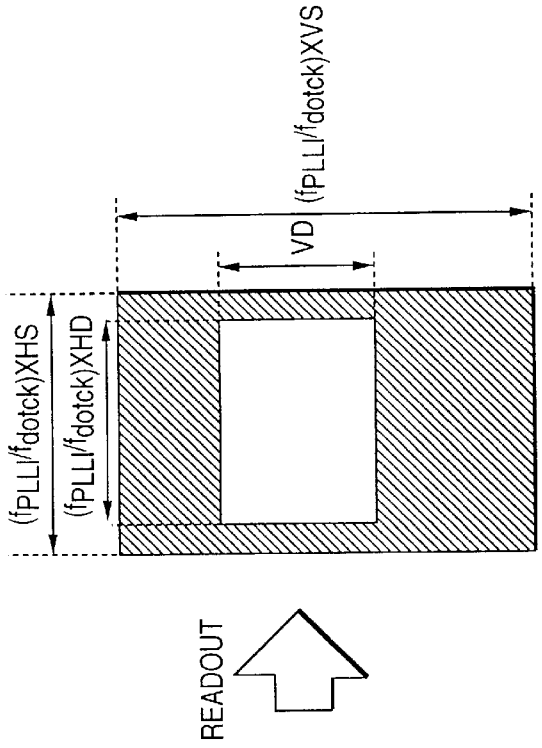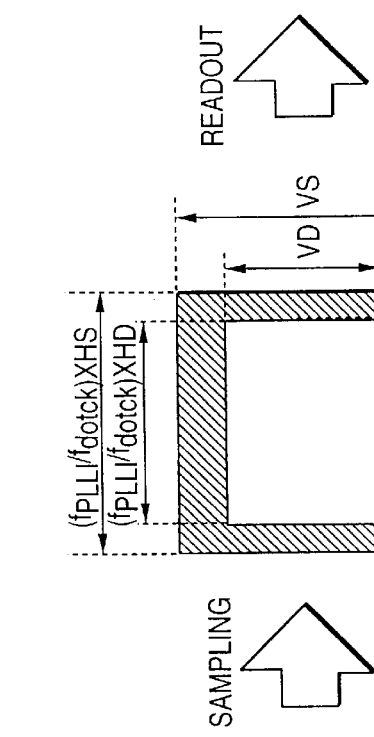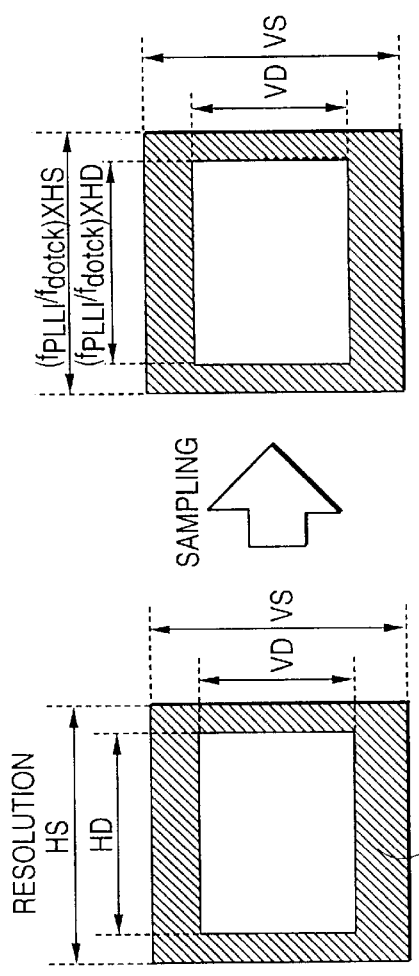

DISPLAY APPARATUS

BACKGROUND OF THE INVENTION

The present invention relates to a display apparatus such as a computer terminal, and more particularly, to a display apparatus that is capable of displaying video signals having different deflection frequencies of horizontal deflection signal provided by various kinds of computers and image producing apparatus.

At present, display apparatus such as computer terminals receive image signals (video signals) of non-standard specifications from computers or the like, and the video signals to be displayed have various scanning frequencies, image display periods, image display positions and image flyback periods. On this account, there is a trend of using a "multi-scan display apparatus" that performs, as a single unit, proper image display for various image signals (video signals).

Among display apparatus of this type, there are many prior art publications pertinent to the reformation for multi-scanning, such as one, as described in Japanese Patent Publication No. 61-8628, originally published as Japanese Patent Application Laid-open No. 53-57914, or the like, which is intended to deal with many scanning frequencies of video signals by making the horizontal oscillation (that is equal to the horizontal deflection frequency) frequency of the horizontal deflection circuit variable to match with the sync signal frequency of a video signal received by the display apparatus by use of a sync oscillation device, and another one, as described in Japanese Patent Application Laid-open No. JP-A-61-100078 or the like, which is intended to adjust the display position on the display screen in coping with the display specifications by shifting the phase of the sync signal in the video signal by use of a monostable multivibrator in a display position modification circuit.

Furthermore, Japanese Patent Application Laid-open No. JP-A-3-73994 discloses a multi-frequency operative CRT display apparatus having a detection circuit which produces a detection signal if the frequency of the horizontal sync signal received by the display apparatus is lower than the preset frequency and a conversion circuit which doubles the deflection frequency of the horizontal deflection circuit and the frequency of the video signal received by the display apparatus in response to the detection signal.

However, this display apparatus, which implements the frequency doubling conversion if the input horizontal sync signal frequency is lower than the predetermined value, achieves the intended effect only for the horizontal sync signal of a particular frequency by repetitive read out of the same scanning line, thereby repeating the content thereof, and cannot deal with signal frequencies in a wide range.

U.S. Pat. No. 5,229,853 discloses a system for converting a video signal from a first format to a second format and is directed to converting from a higher frequency to a lower frequency with a reduction in the number of scanning lines and a reduction in resolution.

The above-mentioned conventional apparatus use many active devices in the deflection circuit in order to deal with the extensive video signal specifications and need a large scale circuitry in order to maintain the operational stability and reliability, leaving problems in achieving the easy fabrication and adjustment of the display apparatus.

Recently, video signals have their scanning frequencies shifted toward the higher region, and consequently the video signal specifications which need to be covered by display apparatus are expanding. Particularly, from the viewpoint of the scanning frequency of video signal, it is desirable to meet a horizontal scanning frequency range from 15.75 kHz of NTSC signals to about 90 kHz for high resolution pictures and CAD/CAM applications.

It is not feasible for the above-mentioned conventional apparatus intact to deal with signals of such a wide range of frequency, but they will be involved in an intricate circuitry and increased number of component parts for the switching control of operational parameters and in an increased circuit scale for retaining the operational reliability. Moreover, it becomes difficult to keep the performance against the deterioration of picture quality and the distortion of image for each video signal. As a result, the number of adjustment points will increase and manufacturing cost will rise.

SUMMARY OF THE INVENTION

Accordingly, an object of the present invention is to provide a display apparatus which can deal with video signals having a variety of scanning frequencies and different resolutions, with the enhancement being made for the performance, reliability and operational stability while suppressing an increase in manufacturing cost.

Another object of the present invention is to provide a display apparatus for receiving video signals which differ in scanning frequencies or resolutions and for converting a received video signal to be within prescribed higher ranges without repetitive readout of the same scanning line.

In order to solve the foregoing problems, a display apparatus is formed of a frequency/resolution conversion unit for converting the scanning frequency and resolution of a video signal and a multi-scan display unit having its operational frequency range suppressed.

According to a feature of the present invention, the frequency/resolution conversion means operates to raise the horizontal scanning frequency or vertical scanning frequency of a video signal received by the display apparatus up to a frequency within a prescribed range, and the multi-scan display unit operates to display the video signal, which has been rendered the frequency conversion by the process of the frequency/resolution conversion unit, accurately at the prescribed position of the screen.

Other and further objects and features of the invention will appear fully from the following description.

BRIEF DESCRIPTION OF THE DRAWINGS

FIGS. 3(A)–3(D) are diagrams for explaining the operation of FIG. 2;

FIGS. 7(A)–7(C) are diagrams for explaining the operation of FIG. 6;

BRIEF DESCRIPTION OF THE PREFERRED EMBODIMENTS

Figure 1:
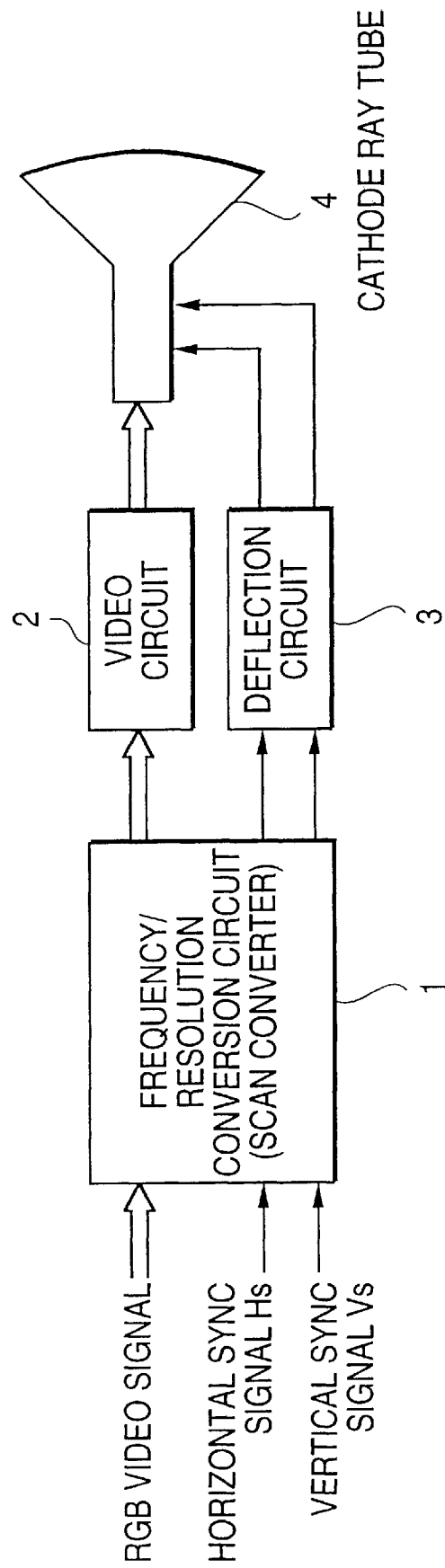
FIG. 1 is a block diagram of a display apparatus according to a first embodiment of the present invention.

Referring now to the drawings wherein like reference numerals are utilized to designate like parts, FIG. 1 is a block diagram showing the display apparatus based on a first embodiment of the invention. The display apparatus comprises a frequency/resolution conversion circuit (hereinafter referred to as a "scan converter") which implements the conversion of frequency or resolution of a video signal received by the display apparatus, a video circuit 2, a deflection circuit 3, and a cathode-ray tube 4.

In the display apparatus shown in FIG. 1, a portion including the video circuit 2, deflection circuit 3 and cathode-ray tube 4 constitutes a multi-scan display apparatus having its operational deflection frequency range set in a narrow range. Namely, multi-scan display apparatus available currently have their operational deflection frequency ranges (these are set in correspondence to the scanning frequencies of video signals received by the display apparatus) set as wide as from about 30 kHz to about 110 kHz in terms of the horizontal deflection frequency, whereas the multi-scan display apparatus based on this invention has its operational horizontal deflection frequency range set narrower close to the upper-limit frequency of the apparatus, e.g., from about 64 kHz to about 110 kHz.

The scan converter 1 converts the horizontal scanning frequency of the input video signal into a frequency range that can be treated by the deflection circuit 3. In regard to the vertical scanning frequency of the input video signal, the vertical resolution of the video signal is converted while retaining the vertical deflection frequency constant so that it is unchanged from that of the input video signal. The scan converter 1 also implements the synchronous reproduction process for the horizontal sync signal Hs and vertical sync signal Vs, which are received together with the video signal, at a frequency virtually equal to the horizontal scanning frequency of the frequency-converted video signal for the horizontal sync signal and at a frequency virtually equal to that of the input for the vertical sync signal, thereby producing horizontal sync pulses Hp and vertical sync pulses Vp.

In this manner, even in the case of receiving a video signal which is lower in frequency than the deflection frequency range that can be treated by the deflection circuit 3, by frequency conversion, the frequency of the received video signal is converted into the prescribed range and can be displayed on the cathode-ray tube 4. In addition, the display apparatus including the scan converter, the video circuit, the deflection circuit, and the cathode-ray tube are provided in the same chassis. Therefore, the display apparatus can treat a very wide scanning frequency range.

Figure 2:
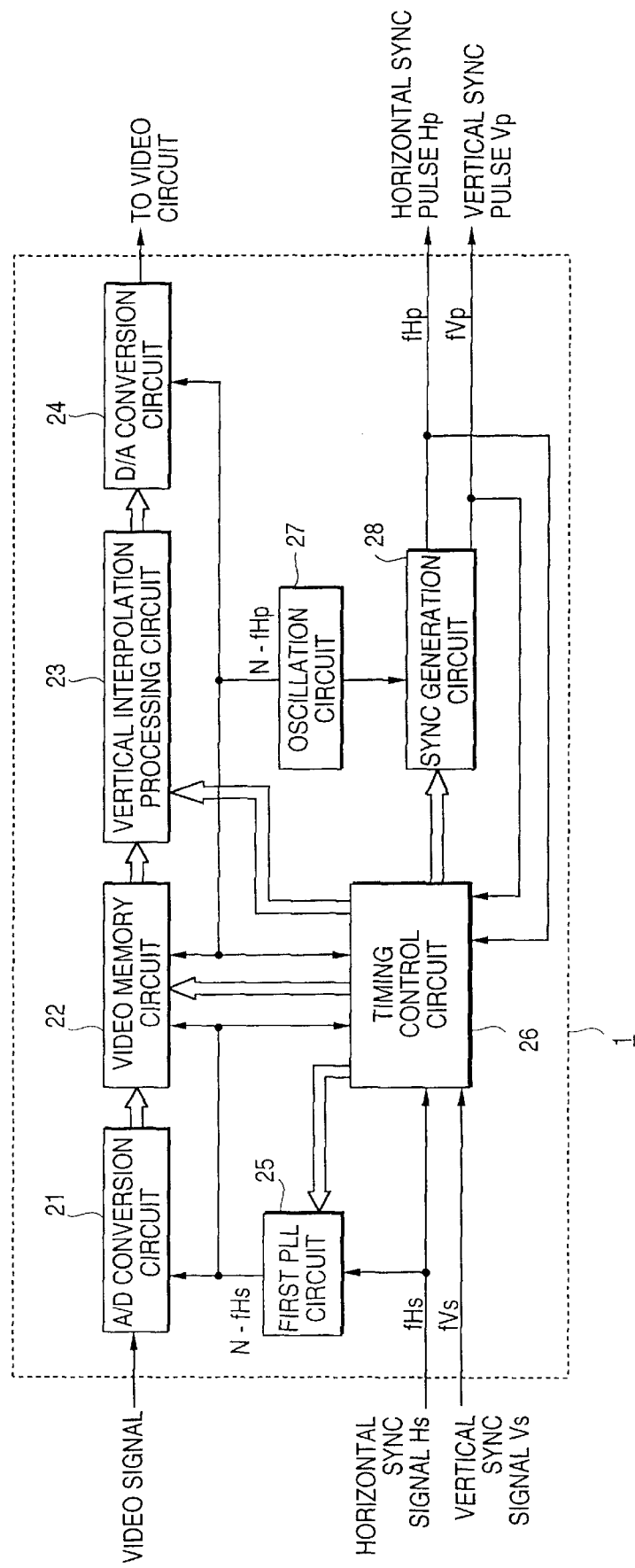
FIG. 2 is a block diagram showing details of the frequency/resolution conversion circuit according to FIG. 1.

FIG. 2 shows a detailed block diagram of the scan converter 1 shown in FIG. 1, which comprises an analog/digital conversion circuit (hereinafter referred to as a "A/D conversion circuit") 21, a video memory circuit 22, a vertical interpolation processing circuit 23, a digital/analog conversion circuit (hereinafter referred to as a "D/A conversion circuit") 24, a PLL circuit 25, a timing control circuit 26, an oscillation circuit 27, and a sync generation circuit 28.

Although FIG. 2 shows the case of processing one channel among three channels of a RGB video signal received by the display apparatus shown in FIG. 1, if it is intended to process three channels, three sets of A/D conversion circuit 21, video memory circuit 22, vertical interpolation processing circuit 23 and D/A conversion circuit 24 are utilized.

The operation of the arrangement of FIG. 2 will be explained by reference to FIGS. 3(A)–3(D). A video signal (FIG. 3(A)) input to the A/D conversion circuit 21 controls the video signal gain and clamps the video DC level, and is digitized at the timing of a sampling clock signal provided by the PLL circuit 25. The PLL circuit 25 forms a phase-locked loop circuit which operates in synchronism with the horizontal sync signal Hs, which is fed to the scan converter 1, to produce a clock signal having a frequency that is N times (N: an integer) the sync signal frequency fHs. In the example of FIGS. 3(A)–3(D), the PLL circuit 25 has its value N set to 2048 so that the resulting clock signal frequency is twice or more the maximum spectrum frequency of a video signal to be digitized so that the sampling theory is satisfied.

In the case where the video signal has a horizontal scanning frequency (fHs) of 31.5 kHz and a vertical scanning frequency (fVs) of 60 Hz in the above example, the PLL circuit 25 produces a clock of 31.5×2048 kHz, and video signal data of 2048 pieces in one horizontal scanning period and 525 lines (fHs/fVs) in the vertical direction (one line corresponds to one horizontal scanning period) is written to the video memory circuit 22, e.g. which consists of a frame memory or a line memory. FIG. 3(B) shows the contents of the video memory circuit 22 after the data has been written. One piece of data represents the resolution of the A/D conversion circuit 21, and it is formed of eight bits in general.

As shown in FIG. 3(C), data stored in the video memory circuit 22 is read out based on the clock from the oscillation circuit 27, and the video signal has its resolution in the vertical direction converted by the vertical interpolation processing circuit 23 so that it has a scanning frequency virtually equal to the input vertical sync signal Vs. This vertical interpolation process is to make the number of horizontal scanning lines per one vertical scanning period to be I×fHp/fHs, where I is the number of vertical scanning lines of the input video signal, fHs is the horizontal scanning frequency, and fHp is the horizontal sync pulse frequency produced by the scan converter 1 (target frequency of conversion and deflection frequency of the deflection circuit 3 shown in FIG. 1, for example, 63 kHz), so that the vertical sync pulse frequency fVp (60 Hz) is equal to the vertical sync signal frequency fVs (60 Hz). Therefore, in this example, 1050 scanning lines are provided while the aforementioned example provided for a frequency doubling, the present invention provides an increase in frequency of the input signal to be within the frequency range of about 30 kHz to about 110 kHz, so as to enable an increase greater than one.

The frequency information is obtained by counting the horizontal sync signal Hs and vertical sync signal Vs for a certain period with a clock signal or the like having a certain frequency in the timing control circuit 26. In case the above calculation yields a fractional part below the decimal point, it may be discarded or the result may be rounded.

The video signal data resulting from the above process is converted back to an analog signal by the D/A conversion circuit 24, as shown in FIG. 3(D), with the read clock being set to N (2048) times the horizontal sync pulse frequency fHp. In the case of FIGS. 3(A)–3(D), the clock frequency is 2048 fHp, and the oscillation circuit 27 produces the clock signal for reading and the conversion of the scanning frequency and/or resolution of the input video signal to prescribed higher ranges is effected without repetitive read-out of the same scanning line. The horizontal sync pulses and vertical sync pulses to be fed to the deflection circuit 3 are reproduced by the sync generation circuit 28 by using the clock signal from the oscillation circuit 27.

In this manner, through the conversion of the horizontal scanning frequency and vertical resolution of a video signal received by the display apparatus of FIG. 1, reception is made possible for the display section formed of the deflection circuit 3, video circuit 2 and cathode-ray tube 4 designed to deal with frequencies higher than the video signal scanning frequency. Accordingly, it is not necessary for the display section to be designed for the wide-band multi-scan operation, and the deflection circuit 3 can be simplified as compared with the conventional ones. In addition, the display section can have its operational frequency range narrowed, and it can have enhanced raster distortion characteristics as compared with the conventional ones.

Figure 4:
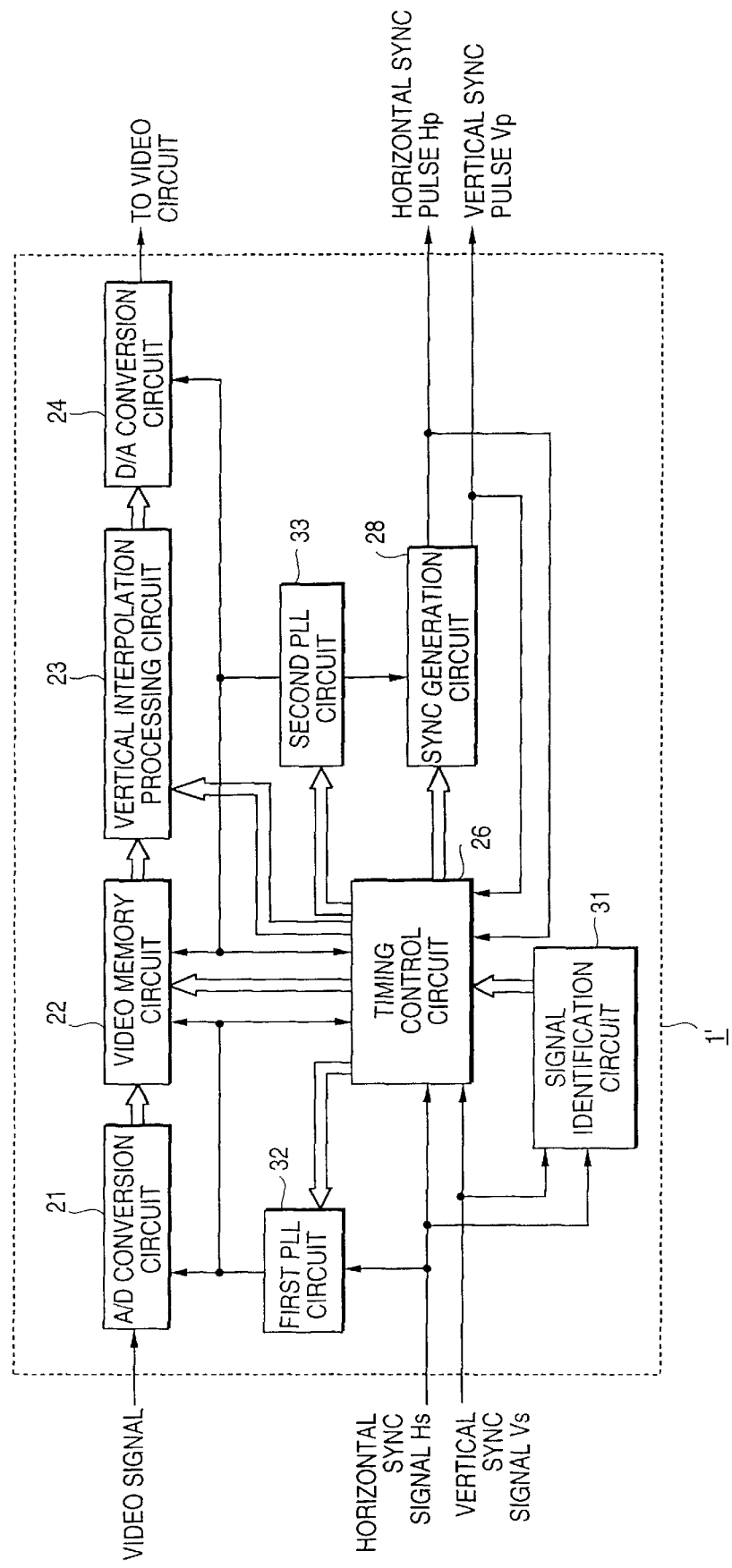
FIG. 4 is a block diagram showing details of a modified frequency/resolution conversion circuit according to FIG. 1.

FIG. 4 is a block diagram showing a modified scan converter 1' for the display apparatus shown in FIG. 1. The scan converter 1' has the same arrangement as the one shown in FIG. 2, except that a signal identification circuit 31 and a second PLL circuit 33 are added, and that a first PLL circuit 32 has a different function. The component parts indicated by the same reference numerals are formed of elements having at least the same functions. According to FIG. 4, the timing specifications and resolution of the input video signal are identified from the horizontal sync signal Hs and vertical sync signal Vs fed to the scan converter 1' and the scanning frequency of the video signal is raised accordingly.

For example, in case where the input video signal is a VGA signal used in personal computers and the display resolution is 640-by-480 dots (a display of 640 dots in the horizontal direction and 480 lines in the vertical direction), the signal identification circuit 31 identifies the resolution and the type of signal based on the frequency and polarity of the horizontal sync signal Hs and vertical sync signal Vs, and sends the identification result to the timing control circuit 26. Based on the identification result, the timing control circuit 26 sets the oscillation frequency of the first PLL circuit 32. In the above example, the horizontal scanning frequency is 31.5 kHz and the total number of dots in a horizontal scanning period is 800 dots, and accordingly the dot clock signal frequency to be reproduced by the first PLL circuit 32 is 31.5 kHz×800=25.2 MHz. The A/D conversion circuit 21 samples the video signal in accordance with this clock and writes the sampled data to the video memory circuit 22. The timing of writing is controlled by the timing control circuit 26.

The vertical interpolation processing circuit 23 reads the video signal data out of the video memory circuit 22 and implements the interpolation process in the vertical direction thereby to produce interpolation data in the vertical direction. This interpolation process is carried out at a multiplication factor of n/m (n, m: integers, n>m) for ease of processing. The read clock generated by the second PLL circuit 33 is also multiplied by n/m with respect to the clock of the first PLL circuit 32 so that the horizontal scanning frequency of the video signal can be raised, with the vertical scanning frequency being left unchanged. Although the multiplication of the read clock by n/m will result in a variable frequency of the horizontal sync pulses Hp produced by the scan converter depending on the timing specifications of the video signal, it can be set within the operational frequency range of the deflection circuit 3 through the appropriate selection of the values n and m.

Based on the foregoing operation, the display apparatus of this invention can deal with video signals having scanning frequencies lower than the operational frequency range of the deflection circuit 3, and it can deal with various video signals without aggravating the reliability and adjustment time of the deflection system.

Figure 5:
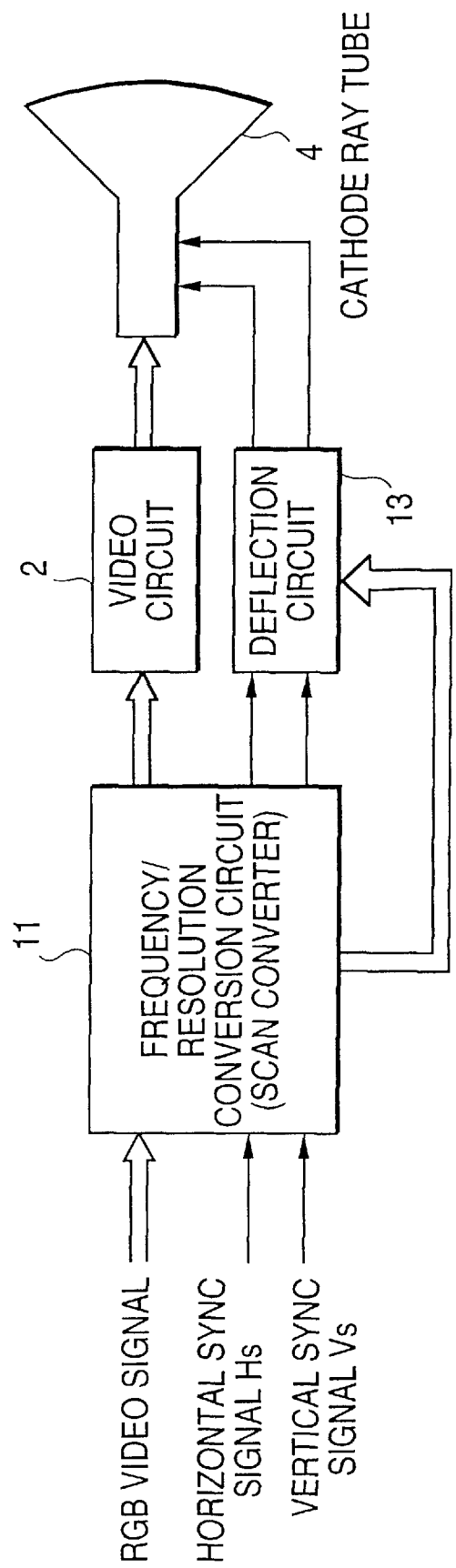
FIG. 5 is a block diagram of a display apparatus according to a second embodiment of the present invention.

FIG. 5 shows a display apparatus according to a second embodiment of this invention which differs from the preceding embodiment of FIG. 1 in the function of the frequency/resolution conversion circuit (hereinafter referred to as "scan converter") 11 and the deflection circuit 13. The other component parts which are referred to by the same reference numerals as those of the embodiment of FIG. 1 have at least the same functions.

The deflection circuit 13 of this embodiment is of a multi-scan design tuned to a specific horizontal deflection frequency and vertical deflection frequency, and it has an operational frequency range set narrower close to the upper limit of the scanning frequency range of various video signals received by the display apparatus. Accordingly, the scan converter 11 having virtually the same operation as that of FIG. 1 further controls the deflection circuit 13 to match with an input video signal and the converted video signal so that the display size and position on the cathode-ray tube 4 are optimized automatically in relation with a variety of display timing.

Figure 6:
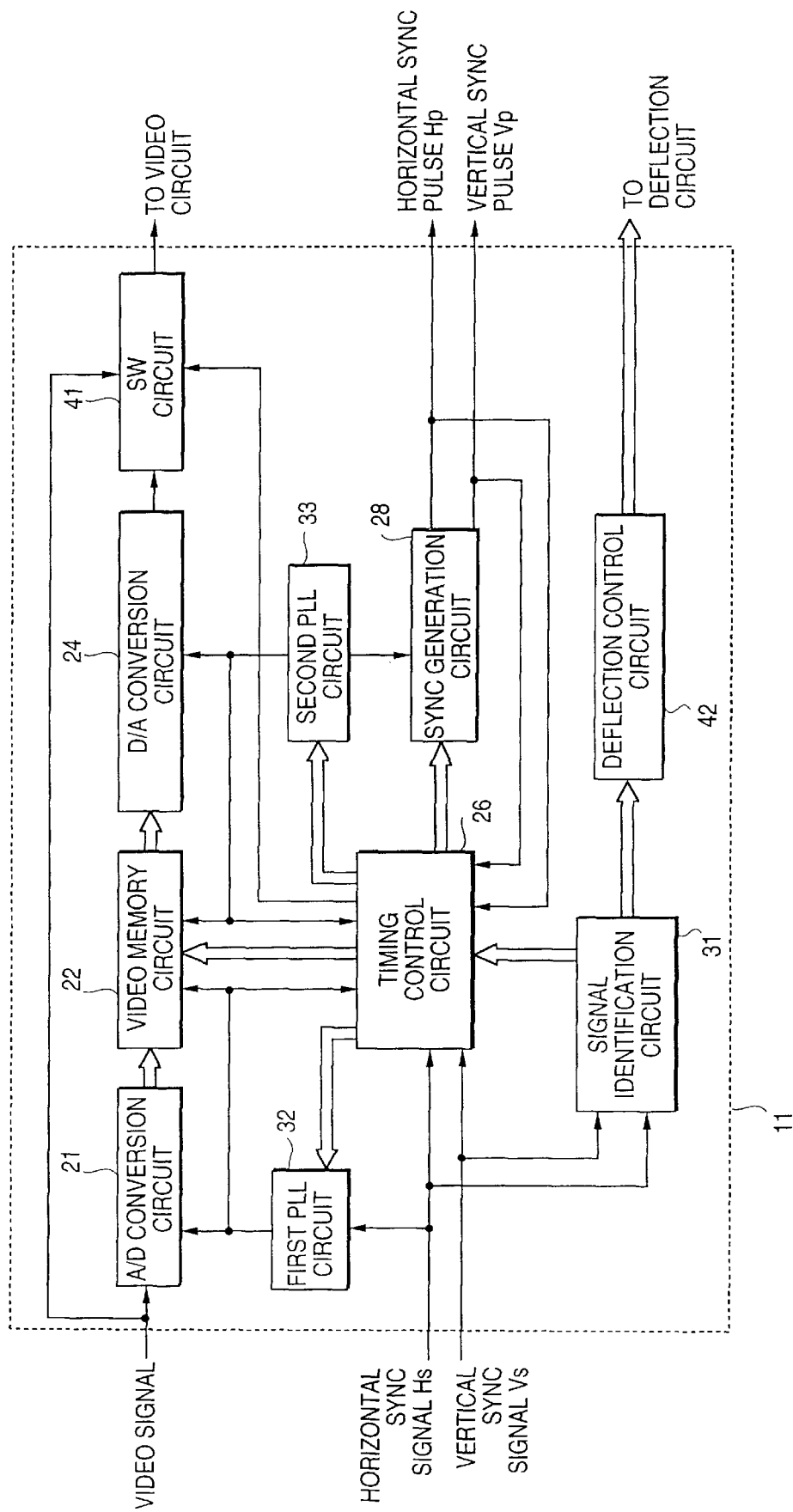
FIG. 6 is a block diagram showing details of the frequency/resolution conversion circuit of FIG. 5.

FIG. 6 shows a detailed arrangement of the scan converter 11 according to FIG. 5 and differs from the scan converter 1' according to FIG. 4 in the addition of a video switching circuit (hereinafter referred to as a "SW circuit") 41 and a deflection control circuit 42 and in the omission of the vertical interpolation circuit 23. The other component parts referred to by the same reference numerals as those of FIG. 4 have at least the same functions.

The operation of the scan converter 11 of FIG. 6 is as follows. Initially, the first PLL circuit 32 has its oscillation frequency varied in response to the scanning frequency fHs of the horizontal sync signal Hs inputted to the scan converter 11. Specifically, in a first case in which the horizontal sync signal frequency fHs is lower than a first prescribed value A, the timing control circuit 26 provides a control signal for the first PLL circuit 32 in response to the identification signal from the signal identification circuit 31 so that it produces a clock signal of a certain oscillation frequency which is at least twice or more the video signal frequency received by the scan converter 11. In a second case in which the horizontal sync signal frequency fHs is higher than a first prescribed value A and lower than a second prescribed value B, the timing control circuit 26 controls the first PLL circuit 32 so that it produces an oscillation clock which is synchronous with the horizontal sync signal Hs.

The A/D conversion circuit 21 samples the input video signal by using the clock signal produced as described above to store video signal data sequentially in the video memory circuit 22. The second PLL circuit 33 has its oscillation frequency controlled by the control signal from the timing control circuit 26 in correspondence to the oscillation frequency of the first PLL circuit 32, and it produces a clock signal having a frequency which is I times (I: an integer greater than 1) the oscillation frequency of the first PLL circuit 32 in the above-mentioned first case, or produces a clock signal having a frequency which is n'/m' times (n' and m' are integers and n'>m') the oscillation frequency of the first PLL circuit 32 in the above-mentioned second case.

Accordingly, video signal data read out of the video memory circuit 22 is reproduced by the D/A conversion circuit 24 as a video signal having a horizontal scanning frequency that is about I times in the above-mentioned first case or n'/m' times the horizontal sync signal Hs in the above-mentioned second case.

In a third case in which the horizontal sync signal frequency fHs received by the scan converter 11 is close to the upper limit frequency correspondent to the deflection circuit 13 and is over the prescribed value B, this condition is detected by the signal identification circuit 31 and consequently the timing control circuit 26 operates on the SW circuit 41 to switch the output of the D/A conversion circuit 24 from the position for feeding the output of the D/A conversion circuit 24 to the video circuit to the position for feeding intact the video signal input to the scan converter 11.

Therefore, it becomes possible to prevent the deterioration of picture quality after the scanning frequency conversion or resolution conversion. The sync pulses to be fed to the deflection circuit 13 are reproduced based on the oscillation clock of the second PLL circuit 33. The vertical scanning frequency and the vertical sync signal frequency of the video signal are treated to have virtually the same values before and after the frequency/resolution conversion, and this process will be explained by reference to FIGS. 7(A)–7(C).

FIG. 7(A) shows the state of the input video signal input to the scan converter 11. In the figure, HD (the unit being a dot) is the horizontal component of the display resolution of this video signal, VD (the unit being a line) is the vertical component, HS is the whole horizontal scanning period and VS is the whole vertical scanning period, with the horizontal scanning frequency fH=a1 and vertical scanning frequency fV=b1 for the input.

The input video signal is sampled by the oscillation clock signal of the first PLL circuit 32, and video signal data is stored in the video memory circuit 22, such as a frame memory circuit, as shown in FIG. 7(B). In FIG. 7(B), fPLL1 is the clock signal frequency of the first PLL circuit 32 and fdotck is the dot clock signal frequency of the input video signal. In this manner, the video signal data stored in the video memory circuit 22 is read by being converted to have its horizontal resolution multiplied by fPLL1/fdotck while being left unprocessed for the vertical resolution.

At reading out of the video signal data which has been written in the video memory circuit 22, the horizontal scanning frequency is converted by using the clock signal of the second PLL circuit 33 having a frequency higher by n'/m' (n' and m' are integers with a relation of n'>m') than that of the first PLL circuit 32, and for the vertical direction the data is read out at the constant display resolution VD as shown in FIG. 7(C) and the vertical blanking period of the picture is increased so that the vertical scanning frequency is virtually the same between the input and output of the scan converter 11. For this control, the timing control circuit 26 implements the calculation of (fPLL1×fdotck)×Vs for the above-mentioned frequency and resolution based on the information provided by the signal identification circuit 31 thereby to increase the number of vertical scanning lines so that the video signal has virtually the same vertical scanning frequency as the input video signal.

In this manner, the video signal output by the scan converter 11 has its horizontal scanning frequency fH raised by n'/m' times so that fH=n'/m'×a1, and the number of vertical scanning lines is also multiplied by n'/m' with fV=b1.

In the case of displaying the processed video signal on the cathode-ray tube 4 shown in FIG. 5, the proportion of the vertical blanking period to the vertical scanning period becomes greater than that of the video signal received by the display apparatus, and therefore the displayed image will be compressed in the vertical direction. For dealing with this matter, the deflection control circuit 42 provides the deflection circuit 13 of FIG. 5 with a control signal which is produced based on the information from the signal identification circuit 31 of FIG. 6 so as to increase the vertical deflection size. Based on the deflection control signal, the deflection circuit 13 increases the vertical raster size displayed in the cathode-ray tube 4, or more specifically, the drive current of the deflection yoke in the cathode-ray tube 4, thereby normalizing the displayed image. Therefore, it becomes possible for the case of using the deflection circuit 13, which can deal with only scanning frequencies and display resolutions of certain ranges, to deal with frequencies outside the operational range of the deflection circuit 13, particularly lower frequencies, through the combinational use of the scan converter 11 of this embodiment. Furthermore, owing to the multi-scan design of the deflection circuit 13 although the operational range is narrow, it is possible to simplify the process of the scan converter 11.

Figure 8:
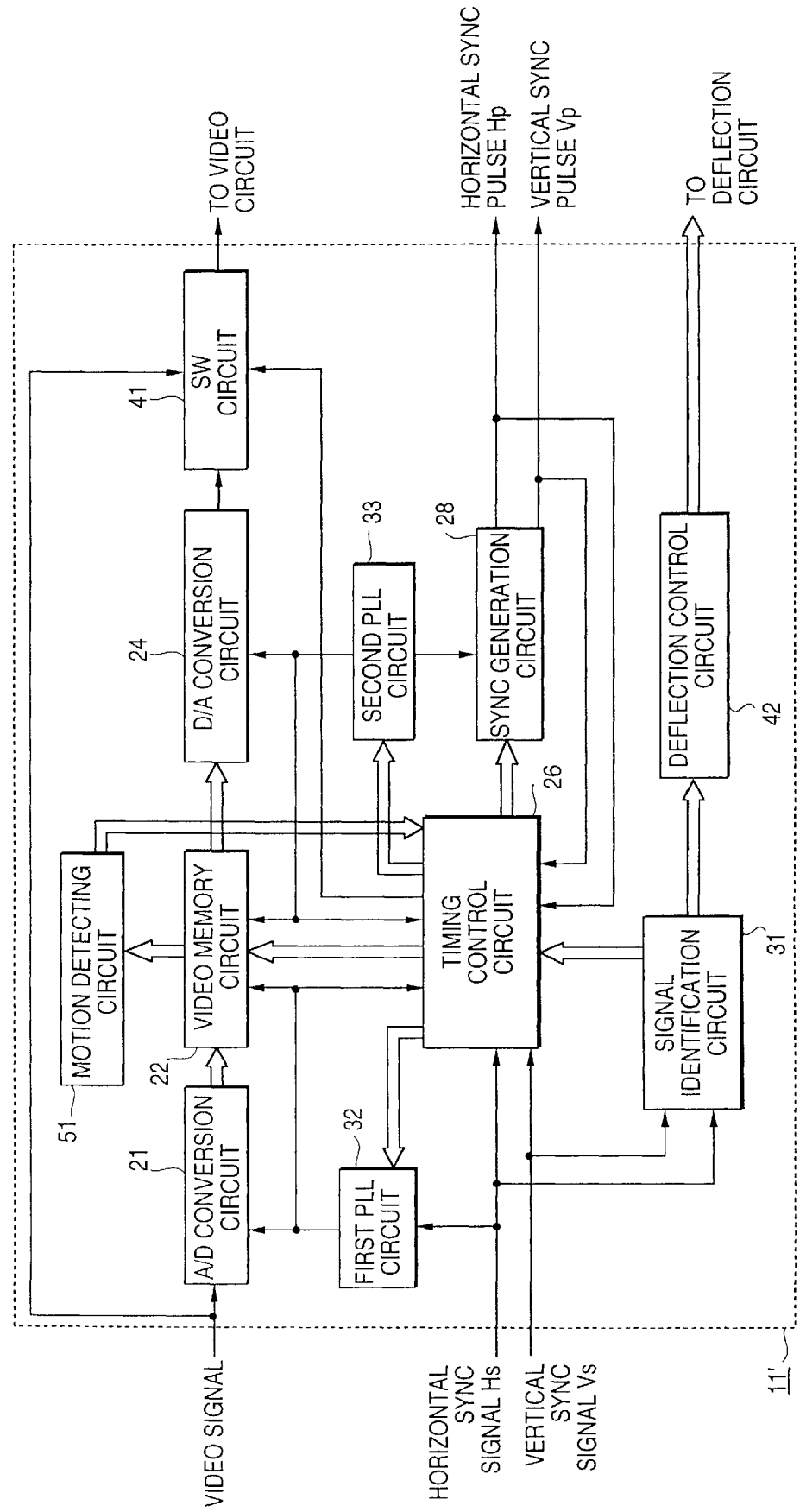
FIG. 8 is a block diagram showing details of another modified frequency/resolution conversion circuit according to FIG. 5.

A modified scan converter 11' for the display apparatus of the embodiment shown in FIG. 5 will be explained with reference to FIG. 8, wherein the scan converter 11' differs from the scan converter 11 shown in FIG. 6, in the addition of a motion detecting circuit 51. The other component parts referred to by the same reference numerals as in FIG. 6 are formed of elements having at least the same functions. The scan converter 11' is designed to switch part of the processing in dependence upon the content of the video signal. Specifically, in the scan converter 11', if there is a small difference of frequency between the input vertical sync signal and output vertical sync pulses, the video memory circuit 22, such as a frame memory circuit operates at a different write speed and read speed, resulting in different numbers of frames between the input video signal and output video signal and thus results in the occurrence of a momentary disorder of image during the reading of video data. For dealing with this matter in this embodiment, the motion detecting circuit 51 detects, based on the content of video data in the video memory circuit 22, that the video signal is of animation pictures and sends motion-detect information to the timing control circuit 26.

Based on the motion-detect information, the timing control circuit 26 operates to skip the reading of the frame at which the video misalignment occurs and reads video data of the previous frame again or the next frame, or implements the interpolation process by detecting the amount of movement of video data at which the frame misalignment occurs. The remaining frequency/resolution conversion process is completely identical to the case explained with reference to FIG. 6. Therefore, it becomes possible to carry out the frequency/resolution conversion without the deterioration of picture quality even for animation video signals.

Another modified scan converter 11" which is different from the scan converter 11 shown in FIG. 6, will be explained with reference to FIG. 9, wherein the scan converter 11" differs from that shown in FIG. 6 in the addition of a superimposition video signal generation circuit (hereinafter referred to as an "imposer") 61 and a digital summing circuit (herein after referred to as a "summing circuit") 62. The other component parts referred to by the same reference numerals as in FIG. 6 are formed of elements having at least the same functions.

Figure 9:
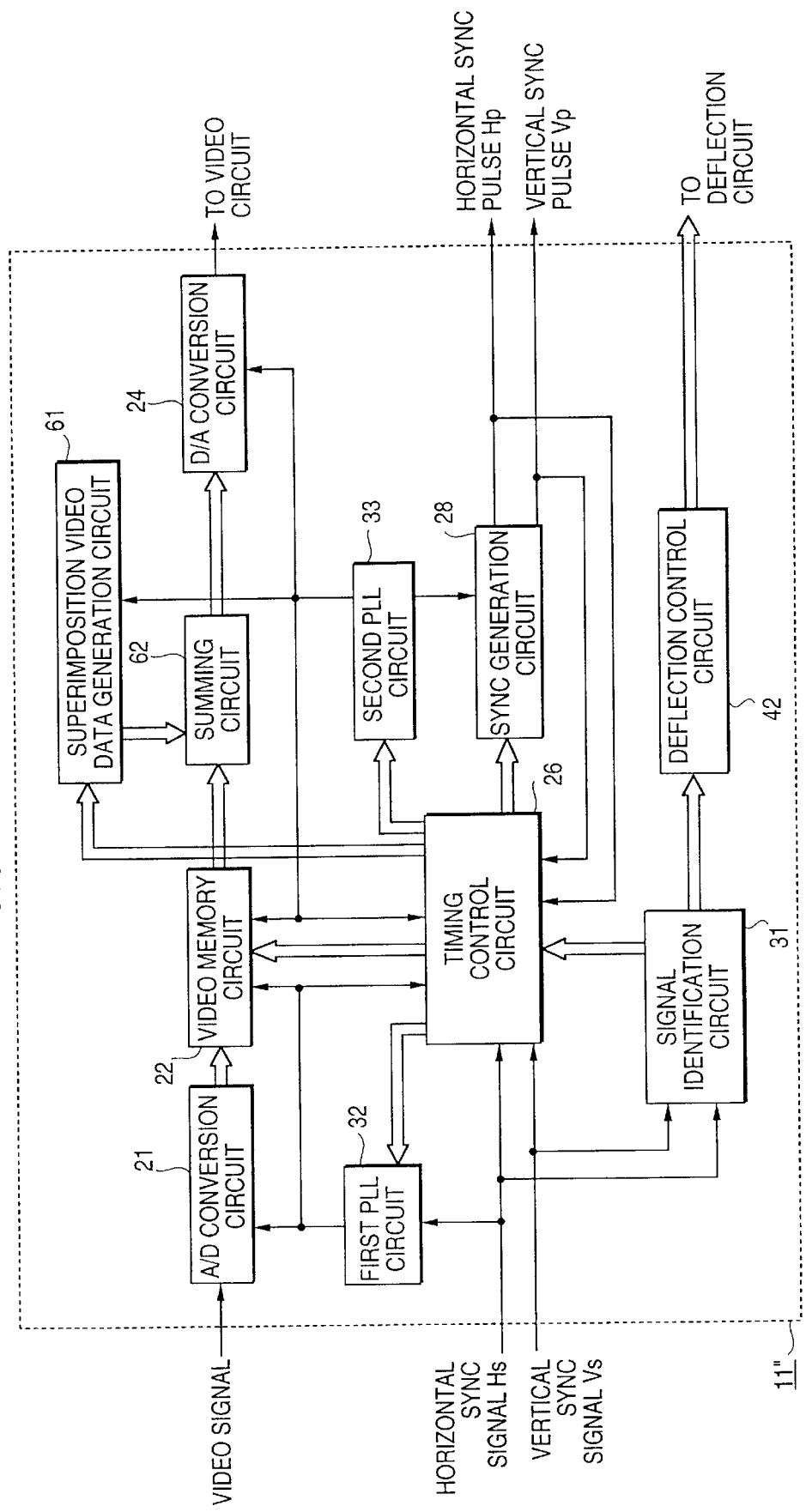
FIG. 9 is a block diagram showing details of a further modified frequency/resolution conversion circuit according to FIG. 5.

In FIG. 9, the imposer 61 generates simple display image data indicative of the type of input video signal and the display state of the display apparatus in accordance with control information from the timing control circuit 26. The display image data from the imposer 61 and video data read out of the video memory circuit 22 are summed by the summing circuit 62 and converted back to an analog video signal by the D/A conversion circuit 24, and the display image is displayed on the screen by being superimposed on the video signal received by the display apparatus. Therefore, an on-screen function which enables the viewer to know the type of input video signal and the display state of the apparatus on the screen of the cathode-ray tube 4 shown in FIG. 5 is achieved, and the apparatus can be more useful. The remaining operation and function are completely identical to the case explained with reference FIG. 6.

Figure 10:
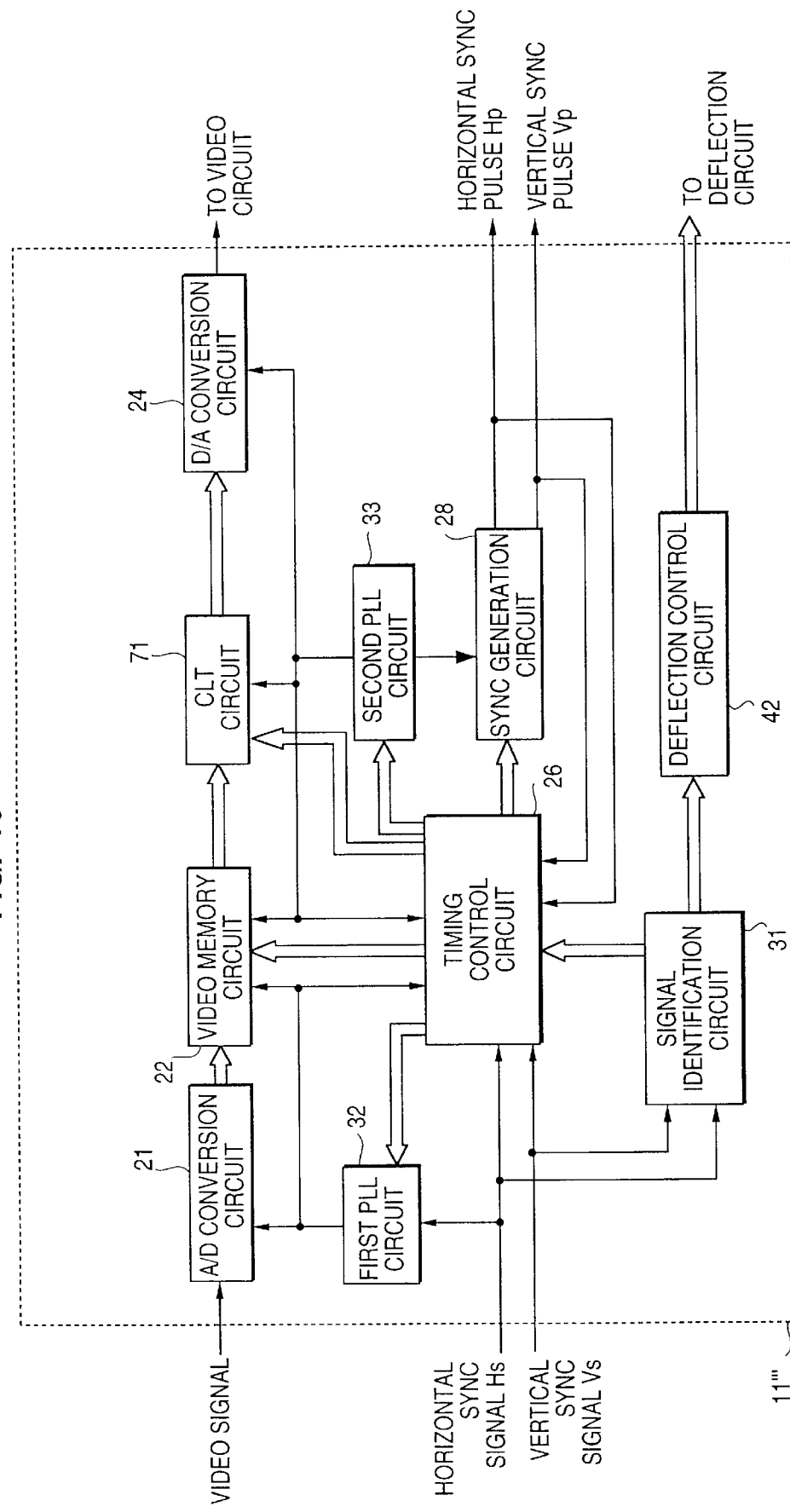
FIG. 10 is a block diagram showing details of a furthermore modified frequency/resolution conversion circuit according to FIG. 5.

A further embodiment of a scan converter 11'" will be explained with reference to FIG. 10, wherein the scan converter 11'" of this embodiment differs from the scan converter 11 shown in FIG. 6 in the addition of a color look-up table circuit (hereinafter referred to as a "CLT circuit") 71. The other component parts referred to by the same reference numerals as in FIG. 6 are formed of elements having the same functions.

In this embodiment, the CLT circuit 71 implements the hue modification or color correction for video data read out of the video memory circuit 22 such as a frame memory circuit so that the displayed color of the image on the cathode-ray tube 4 is as intended. For example, the cathode-ray tube 4 has a nonlinear characteristic, i.e. γ characteristic, for the video signal amplitude due to the inherent property of the fluorescent material, which is different among individual display apparatus, and this modification data is stored in the CLT circuit 71 and the intended display color is attained based on the stored data. Through the sampling of the input video signal of the display apparatus in this manner, digital signal processing is made possible and the enhancement of picture quality can be accomplished. The remaining operation of the circuit is identical to the case explained with reference to FIG. 6.

A display apparatus according to a third embodiment of the invention will be explained with reference to FIG. 11 and FIG. 12, wherein this embodiment is characterized in the use of a scan converter having a function different from those of FIG. 1 and FIG. 5, with the remaining circuits having the same operation as the embodiment of FIG. 5.

Figure 11:
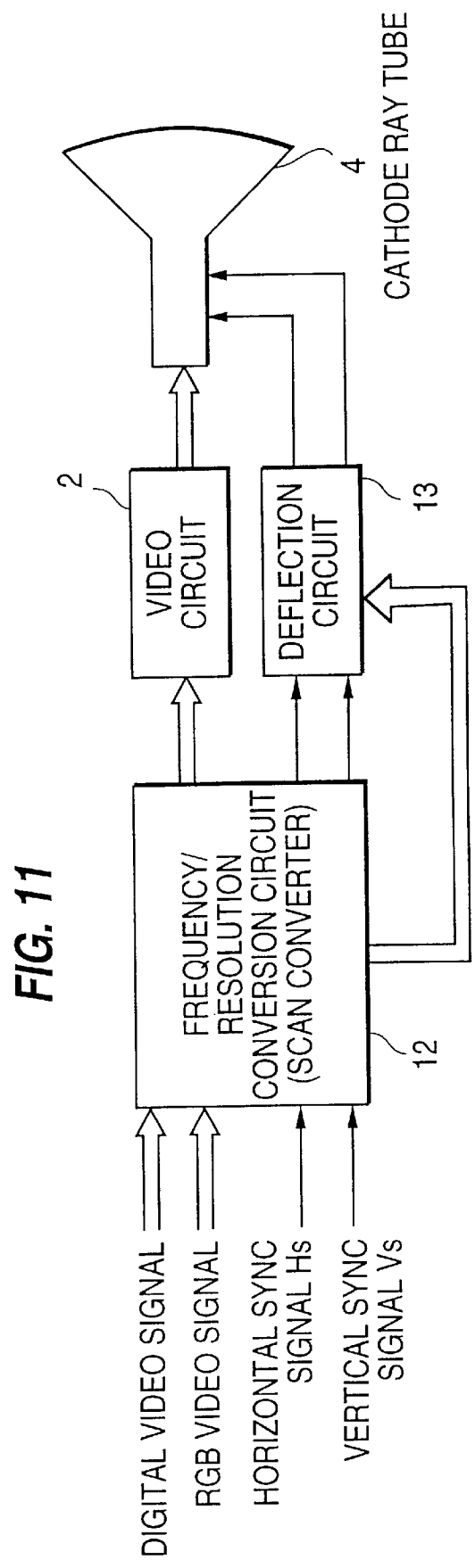
FIG. 11 is a block diagram of a display apparatus according to a third embodiment of the present invention.

In FIG. 11, a scan converter 12 receives a digital video signal, e.g., a digital video signal held in a CD-ROM unit or hard disk unit or a digital video signal held in a computer connected through a network or a digital TV signal, in addition to the analog video signal applicable to usual display apparatus. The digital video signal and analog video signal are merged by the scan converter 12 so that one is superimposed on the other for display, or one is displayed in a window formed in the other. Accordingly, it becomes possible to display video signals of different types based on the superimposition.

The detailed arrangement of the scan converter 12 for the display apparatus shown in FIG. 11 will be explained with reference to FIG. 12, wherein the scan converter 12 differs from the scan converter 1 of the display apparatus of the first embodiment shown in FIG. 1 and the scan converters 11—11'" of the display apparatus of the second embodiment shown in FIG. 5 in the provision of an interface circuit (hereinafter referred to as an "I/F circuit") 81, a second video memory circuit (hereinafter referred to as a "buffer") 82, and a second signal selection circuit (hereinafter referred to as a "second SW circuit"). The other component parts referred to by the same reference numerals as in FIG. 6 are formed of elements having the same functions.

Figure 12:
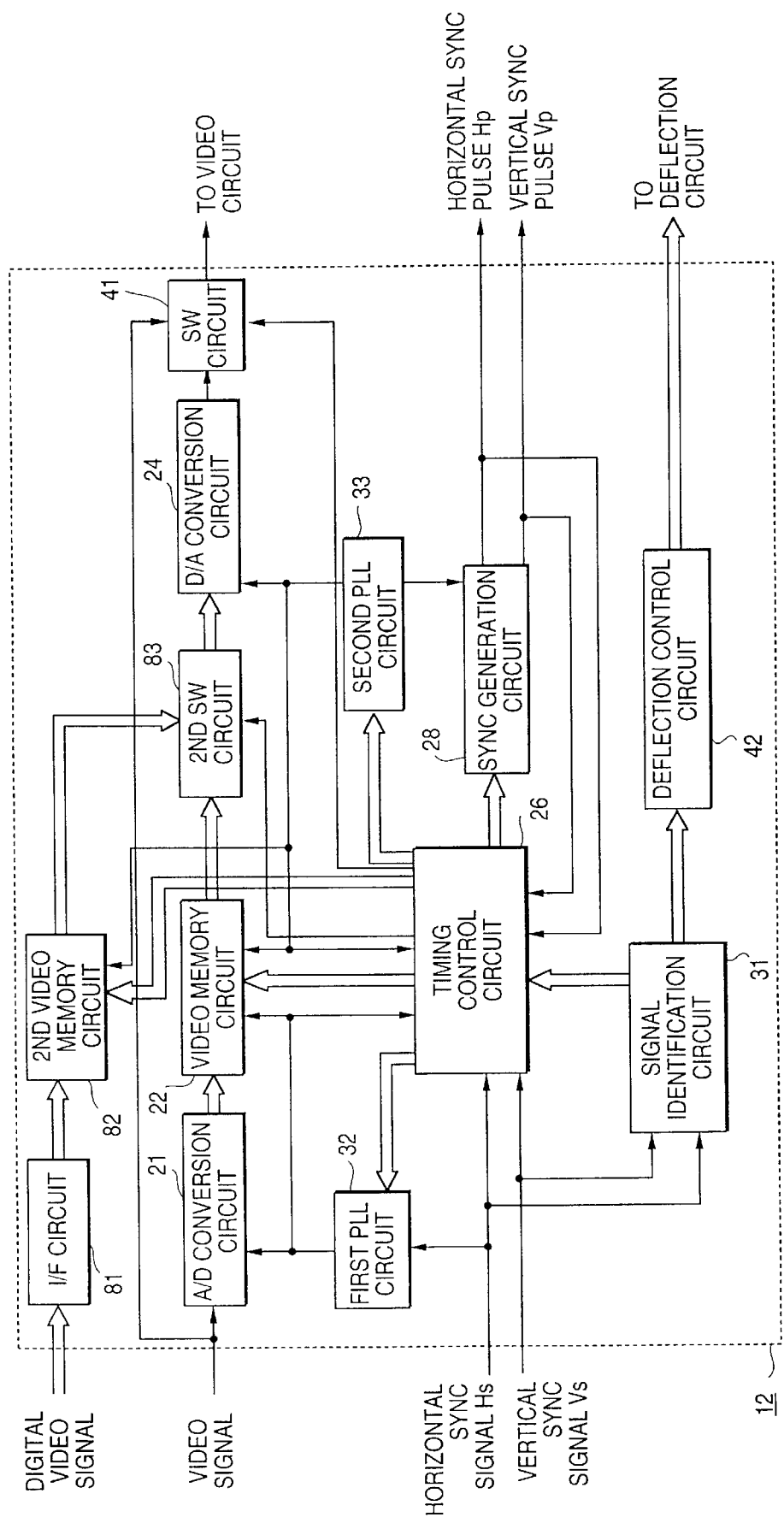
FIG. 12 is a block diagram showing details of a frequency/resolution conversion circuit according to FIG. 11.

In FIG. 12, the A/D converter 21, second SW circuit 83, video memory circuit 22 such as a frame memory circuit, D/A conversion circuit 24, first SW circuit 41 and buffer memory 82 are required for each channel of the RGB video signal, although only one channel is shown in the figure. Actually, three sets of the same circuit are used for the R, G and B channels. The digital video signal received by the I/F circuit 81 has its video data format converted into a line-sequential video format similar to the usual RGB video signal and then converted into an analog signal, and it can be treated as a video signal for display. The format-converted video data is held temporarily in units of frame in the buffer 82. The video data held in the buffer 82 and the video signal data which has been sampled by the A/D conversion circuit 21 and held in the video memory circuit 22 are switched at a proper timing by the second SW circuit 83 under control of the timing control circuit 26. Therefore, the video signal output by the D/A conversion circuit 24 is either the merged analog RGB video signal and digital video signal or one of these signals. In this manner, it becomes possible to display images through the connection with digital equipment such as a CD-ROM unit and hard disk unit, digital VCR, an digital telecommunication unit. The other functions are identical to the case explained with reference to FIG. 6.

Figure 13:
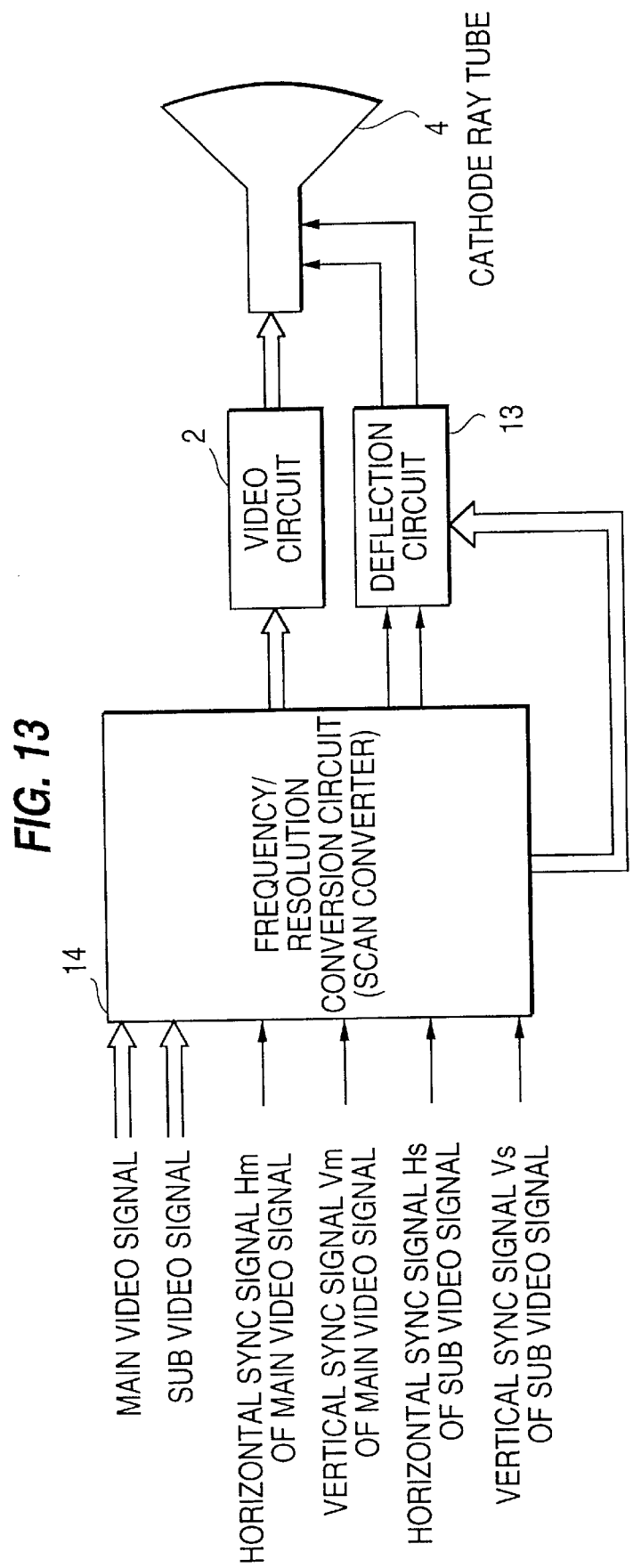
FIG. 13 is a block diagram of a display apparatus according to a fourth embodiment of the present invention.

FIG. 13 shows a display apparatus according to a fourth embodiment of this invention which utilizes a scan converter 14 having a function different from the scan converter of FIG. 1, FIG. 5 and FIG. 11, with the remaining circuits having the same operation as in FIG. 5 and FIG. 11. In FIG. 13, the scan converter 14 receives a first video signal (main video signal) and a second video signal (subordinate or sub video signal). The scan converter 14 merges these video signals by forming a window in the image of the main video signal so that the sub video signal is displayed in it, or displays one of these video signals on the entire screen.

Figure 14:
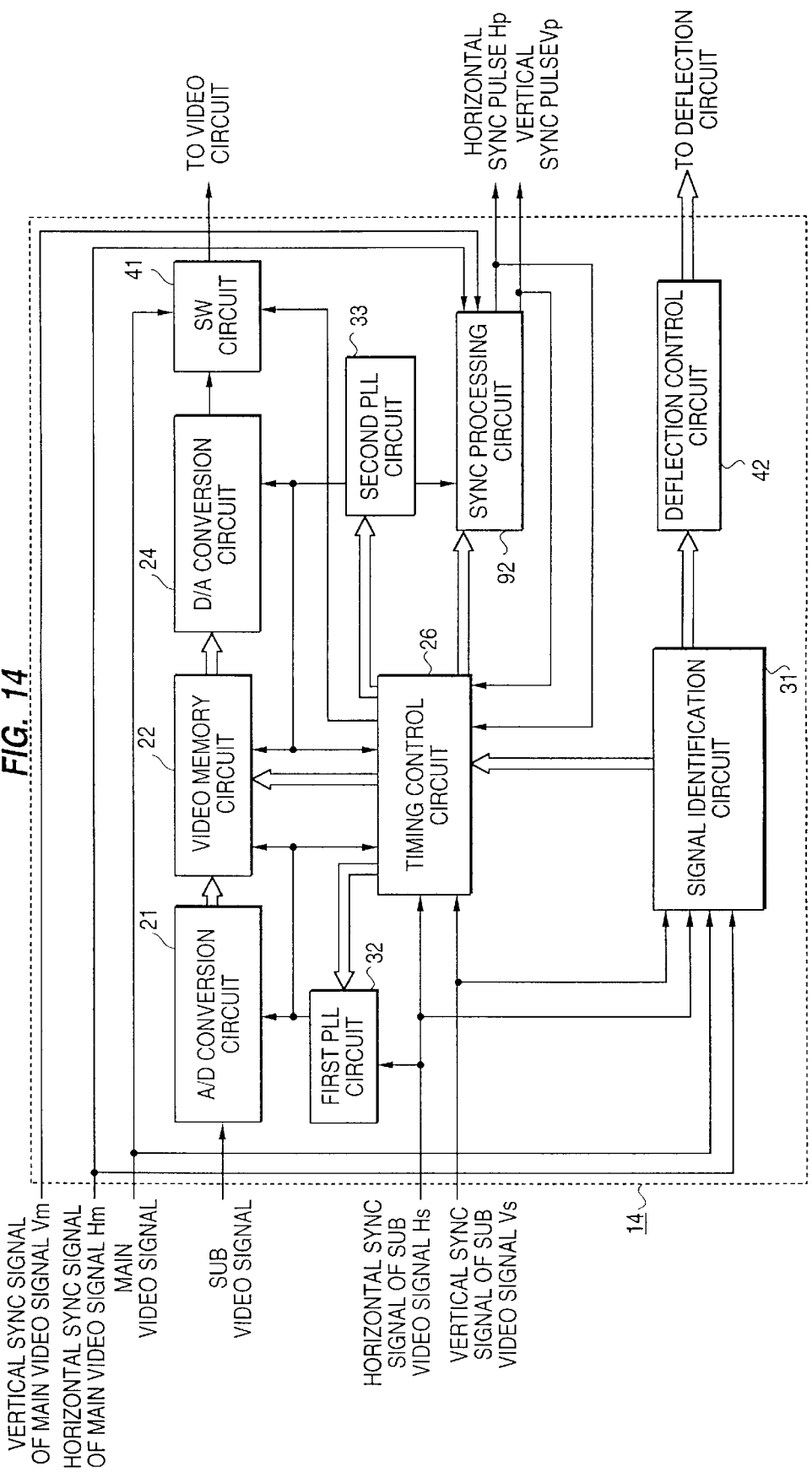
FIG. 14 is a block diagram showing details of a frequency/resolution conversion circuit according to FIG. 13.

The detailed arrangement of the scan converter 14 for the display apparatus shown in FIG. 13 will be explained with reference to the block diagram of FIG. 14, wherein the scan converter 14 differs from the scan converters described previously in the provision of a sync processing circuit 92 in place of the sync generation circuit. Other component parts referred to by the same reference numerals as those in FIG. 2 through FIG. 12 are formed of elements having the same functions. In FIG. 14, the A/D conversion circuit 21, video memory circuit 22, D/A conversion circuit 23, and SW circuit 41 are required for each channel of the RGB video signal, although only one channel is shown in the figure. Actually, three sets of the same circuits are used for R, G and B channels. Although the remaining circuit section can be used commonly for the R, G and B channels, the clock generating circuits including the first PLL circuit 32 and the second PLL circuit 33, for example, may be provided independently for each channel so as to allow the adjustment of the clock generation timing.

The main video signal is received by the SW circuit 41, while the sub video signal is sampled and converted into a digital video signal by the A/D conversion circuit 21 in response to a sampling clock generated by the first PLL circuit 32. The sampling clock has its frequency set equal to that of the dot clock which is used for the creation of the sub video signal by the video signal generator of the video signal sourcing computer. Specifically, the first PLL circuit 32 generates the clock by multiplying the horizontal sync signal Hs of the sub video signal. Subsequently, the digital video signal is stored in the video memory circuit 22 under control of the timing control circuit 26, and thereafter it is read out in synchronism with the clock generated by the second PLL circuit 33 under control of the timing control circuit 26. The readout video signal is processed by the D/A conversion circuit 24 and delivered as a frequency-converted analog video signal.

In the case of the picture-in-picture display mode in which the sub video signal is displayed in a window frame inserted in the main video signal, the horizontal and vertical sync signals Hm and Vm of the main video signal which are fed to the sync processing circuit 92 are selected, and the digital video signal is read out of the video memory circuit 22 in synchronism with these sync signals. By setting the clock signal frequency of the second PLL circuit 33 equal to that of the dot clock used in the creation of the main video signal on the part of the computer, it is possible to retain the relation of display resolution between the main and sub video signals. In this manner, the sub video signal is frequency converted and is synchronized with the main video signal. Subsequently, the resulting sub video signal is received by another input of the SW circuit 41, by which it is selected under control of the timing control circuit 26. Based on the switching operation, the sub video signal is merged into the main video signal. In this embodiment, where the sub video signal is inserted in the main video signal, the main video signal has a higher resolution and also a higher scanning frequency than the subvideo signal.

Although in this embodiment, the PLL circuits 32 and 33 generate clock signals of the same frequency as the dot clock of video signals, the clock frequencies may be varied properly so that the image of the sub video signal is displayed in an enlarged or reduced size in the image of the main video signal. For example, when the second PLL circuit 33 produces a clock frequency that is twice the dot clock frequency of the main video signal, the displayed image of the sub video signal is halved, or when the PLL clock frequency is half the dot clock frequency of main video signal, the displayed image is doubled.

For a display mode without merging two video signals, as in the case of displaying only the main video signal, the SW circuit 41 and sync processing circuit 92 select and deliver the main video signal and the horizontal sync signal Hm and vertical sync signal Vm to the video circuit and the deflection circuit, respectively. Otherwise, in the case of displaying only the sub video signal, the scan converter 14 operates in the manner as the scan converter 11 shown in FIG. 6, i.e. the SW circuit 41 selects the output of the D/A conversion circuit 24, and the sync processing circuit 92 operates in the same manner as the sync generation circuit 28 of the scan converter 11 shown in FIG. 6 to generate the horizontal sync pulse Hp and vertical sync pulse Vp. In this manner, this embodiment is capable of displaying video signals of different display timings on the same screen.

Figure 15:
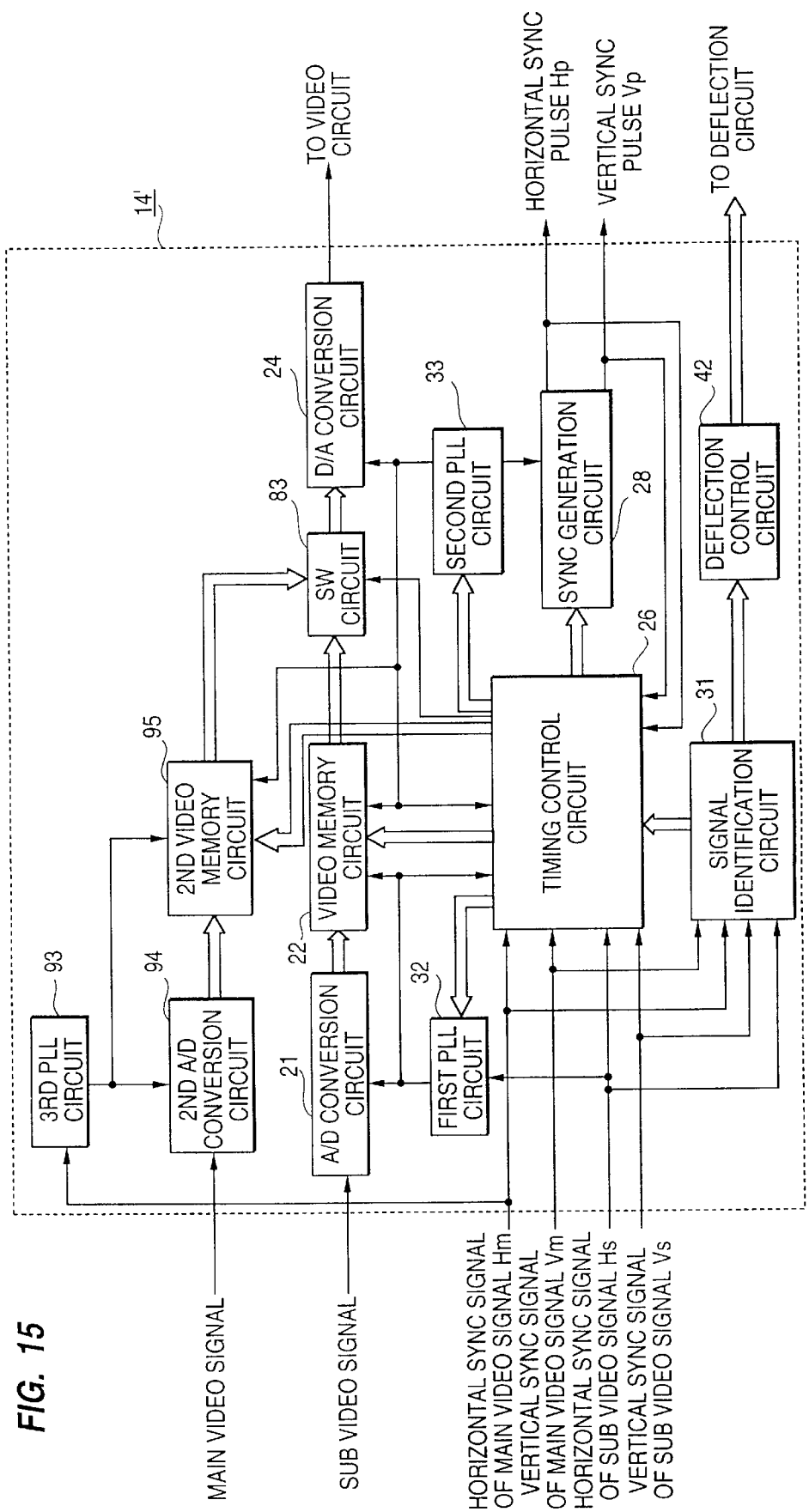
FIG. 15 is a block diagram showing details of a modified frequency/resolution conversion circuit according to FIG. 13.

FIG. 15 shows a modified scan converter 14', wherein the scan converter 14' includes a third PLL circuit 93, a second A/D conversion circuit 94 and a second video memory circuit 95. The other component parts referred to by the same reference numerals as those of the scan converter shown in FIG. 2 through FIG. 15, are formed of elements having the same functions. The A/D conversion circuits 21 and 94, video memory circuits 22 and 95, D/A conversion circuit 23, and SW circuit 83 are required for each channel of the RGB video signal, although only one channel is shown in the figure. Actually, three sets of the same circuits are used for the R, G and B channels. Although the remaining circuit section can be used commonly for the R, G and B channels, the clock generating circuits including PLL circuits 32 and 33, for example, may be provided independently for each channel so as to allow the adjustment of clock generation timing.

In FIG. 15, the main video signal is digitized by the second A/D conversion circuit 94 and the third PLL circuit 93, which generates a clock of the same frequency as the dot clock used for the creation of the video signal on the part of the computer. The digitized main video signal is stored in the second video memory circuit 95. The sub video signal is stored in the video memory circuit 22 by the similar operation as the scan converter 14 shown in FIG. 14. The contents of the video memories 22 and 95 are read out under control of the timing control circuit 26 and are digitally merged by the SW circuit 83. This merging process accomplishes the display modes of superimposing a sub video signal on a main video signal, superimposing a main video signal on a sub video signal, and displaying only one of these video signals.

In the scan converter of FIG. 15, in which the main and sub video signals are merged in a digital manner, both video signals can have their scanning frequencies converted at the time of conversion of the merged video signal back to an analog video signal by the D/A conversion circuit 24. Therefore, for the display apparatus shown in FIG. 13, the deflection circuit 13 of the display section connected to the scan converter 14' can have its operational frequency range more narrowed than the case of the embodiment of FIG. 14 or even can have a fixed frequency, resulting in an enhanced performance of the display section.

Although the foregoing embodiments describe the case of processing two kinds of video signals having different timing specifications, an increased number of different input video signals can be merged or selected for display through the additional provision of the same A/D conversion circuits, PLL circuits and video memory circuits and the addition of control signals to the timing control circuit 26 and input signals to the SW circuit 83, accordingly.

While we have shown and described several embodiments in accordance with the present invention, it is understood that the same is not limited thereto but is susceptible of numerous changes and modifications as known to those skilled in the art, and we therefore do not wish to be limited to the details shown and described herein but intend to cover all such changes and modifications as are encompassed by the scope of the appended claims.

We claim:

1. A display apparatus for receiving video signals which differ in scanning frequencies or resolutions, comprising:
   a receiver capable of receiving any of a plurality of predetermined video signals differing in scanning frequencies or resolutions;
   a multi-frequency/resolution converter for converting at least one of a scanning frequency and a horizontal resolution of a received video signal from said receiver so as to be within predetermined higher ranges without changing a vertical display resolution of said received video signal, said multi-frequency/resolution converter being capable of selectably converting at least two different video signals of said predetermined video signals differing in scanning frequencies or resolutions; and
   a display for displaying a converted said received video signal from said multi-frequency/resolution converter.

2. A display apparatus for receiving video signals which differ in scanning frequencies or resolutions, comprising:
   means for receiving at least one video signal;
   conversion means for converting at least one of the scanning frequency and resolution of the at least one received video signal so as to be within predetermined higher ranges thereof, said conversion means including an A/D conversion circuit for digitizing the at least one received video signal, a video memory circuit for holding an output of said A/D conversion circuit in units of a vertical scanning period, a D/A conversion circuit for converting an output of said video memory circuit into an analog signal and for providing an output thereof, a PLL circuit for supplying a first clock signal which is synchronous with a horizontal sync signal of the at least one received video signal to said A/D conversion circuit, an oscillation circuit for supplying a second clock signal to said D/A conversion circuit, a sync generation circuit for producing horizontal sync pulses and vertical sync pulses for a deflection circuit of said display apparatus in synchronism with the second clock signal from said oscillation circuit, a timing control circuit for controlling at least predetermined respective circuits of said conversion means, a signal identification circuit for producing identification information of the at least one received video signal for said timing control circuit, and deflection control means for producing control signals for deflection size and deflection position of a displayed image for said deflection circuit of said display apparatus from an output of said signal identification circuit; and
   display means including said deflection circuit for displaying the converted received at least one video signal.

3. A display apparatus according to claim 2, wherein said video memory circuit of said conversion means includes a frame memory circuit.

4. A display apparatus according to claim 2, wherein said conversion means further includes a video signal switching circuit for selecting the output of said D/A conversion circuit or the at least one received video signal and for providing an output thereof.

5. A display apparatus according to claim 4, wherein said conversion means further includes movement detection means for detecting a moving portion in the content of the at least one received video signal based on information held in said video memory circuit and for providing an output indicative of the movement information to said timing control circuit.

6. A display apparatus according to claim 2, wherein said conversion means further includes a video data generation circuit for generating digital video information different from the at least one received video signal, and summing means for superimposing an output of said video data generation circuit on an output of said video memory circuit, said D/A conversion means converting the output of said summing circuit into an analog signal.

7. A display apparatus according to claim 2, wherein said conversion means further includes a color conversion circuit for assigning prescribed color information to the output of the video memory circuit, said D/A conversion circuit converting the output of said video memory circuit having the assigned color information by said color conversion circuit to an analog signal.

8. A display apparatus for receiving video signals which differ in scanning frequencies or resolutions, comprising:
   a display including a deflection circuit controllable for deflection size and deflection position of a displayed image by control signals;
   a receiver capable of receiving any of a plurality of predetermined video signals differing in scanning frequencies or resolutions; and
   a multi-frequency/resolution converter for converting at least one of a scanning frequency and resolution of a received video signal from said receiver so as to be within predetermined higher ranges and within receivable ranges of said display, said multi-frequency/resolution converter being capable of selectably converting at least two different video signals of said predetermined video signals differing in scanning frequencies or resolutions, and including a control signal generator for providing said control signals to said deflection circuit so as to control an aspect ratio of said display.

9. A display apparatus according to claim 8, wherein said multi-frequency/resolution converter include means for enabling said display apparatus to receive video signals having a digital signal form.

10. A display apparatus for receiving video signals which differ in scanning frequencies or resolutions, comprising:
    display means including a deflection circuit controllable for deflection size and deflection position of a displayed image by control signals;
    means for receiving at least one video signal;
    conversion means for converting at least one of the scanning frequency and resolution of the at least one received video signal so as to be within predetermined higher ranges thereof and within receivable ranges of said display apparatus, said conversion means including control signal means for providing said control signals to said deflection circuit so as to control an aspect ratio of said display means;
    wherein said conversion means include means for enabling said display apparatus to receive video signals having a digital signal form; and
    wherein said conversion means includes an A/D conversion circuit for digitizing the at least one received video signal, a first video memory circuit for holding an output of said A/D conversion circuit in units of a vertical scanning period, an interface circuit for receiving a digital video signal and for converting the received digital video signal to a prescribed signal form, a second video memory circuit for holding an output of said interface circuit, a first switching circuit for selecting an output of said second video memory circuit or an output of said first video memory circuit, a D/A conversion circuit for converting an output of said first switching circuit into an analog signal, a second switching circuit for selecting an output of said D/A conversion circuit or the at least one received video signal, a PLL circuit for supplying a first clock signal which is synchronous with a horizontal sync signal of the at least one received video signal to said A/D conversion circuit, an oscillation circuit for supplying a second clock signal to said D/A conversion circuit, a sync generation circuit for producing horizontal sync pulses and vertical sync pulses for said deflection circuit of said display apparatus in synchronism with the second clock signal from said oscillation circuit, a timing control circuit for controlling at least predetermined respective circuits of said conversion means, a signal identification circuit for producing identification information of the at least one received video signal for said timing control circuit, and a deflection control circuit for producing control signals for deflection size and deflection position of a displayed image for said deflection circuit of said display apparatus from an output of said signal identification circuit.

11. A display apparatus according to claim 10, wherein said first video memory circuit and said second video memory circuit of said conversion means each include a frame memory circuit.

12. A display apparatus according to claim 8, wherein said receiver receives at least first and second different video signals.

13. A display apparatus for receiving video signals which differ in scanning frequencies or resolutions, comprising:

display means including a deflection circuit controllable for deflection size and deflection position of a displayed image by control signals;

means for receiving at least one video signal;

conversion means for converting at least one of the scanning frequency and resolution of the at least one received video signal so as to be within predetermined higher ranges thereof and within receivable ranges of said display apparatus, said conversion means including control signal means for providing said control signals to said deflection circuit so as to control an aspect ratio of said display means;

wherein said receiving means receives at least first and second different video signals; and wherein said conversion means further include an A/D conversion circuit for digitizing the second received video signal, a video memory circuit for holding an output of said A/D conversion circuit, a D/A conversion circuit for converting an output of said video memory circuit into an analog signal, a switching circuit for selecting an output of said D/A conversion circuit or the first received video signal, a first PLL circuit for supplying a first clock signal which is synchronous with a horizontal sync signal of the second received video signal to said A/D conversion circuit, a second PLL circuit for supplying a second clock signal to said D/A conversion circuit, a sync processing circuit for receiving a horizontal sync signal and a vertical sync signal of the first received video signal and the second clock signal of said second PLL circuit for providing horizontal sync pulses and vertical sync pulses for said deflection circuit of said display apparatus by selecting horizontal and vertical sync pulses produced from the second clock signal of said second PLL circuit or the sync signal of the first received video signal, a timing control circuit for controlling at least respective predetermined circuits of said conversion means, a signal identification circuit for producing identification information for each received video signal for said timing control circuit, and a deflection control circuit for producing control signals for deflection size and deflection position of a displayed image from the output signal of said signal identification circuit and for providing the control signals to said deflection circuit of said display apparatus.

14. A display apparatus according to claim 13, wherein said video memory circuit includes a frame memory circuit.

15. A display apparatus for receiving video signals which differ in scanning frequencies or resolutions, comprising:

display means including a deflection circuit controllable for deflection size and deflection position of a displayed image by control signals;

means for receiving at least one video signal;

conversion means for converting at least one of the scanning frequency and resolution of the at least one received video signal so as to be within predetermined higher ranges thereof and within receivable ranges of said display apparatus, said conversion means including control signal means for providing said control signals to said deflection circuit so as to control an aspect ratio of said display means;

wherein said receiving means receives at least first and second different video signals; and wherein said conversion means further includes a first A/D conversion circuit for digitizing the first received video signal, a first video memory circuit for holding an output of said first A/D conversion circuit, a second A/D conversion circuit for digitizing the second received video signal, a second video memory circuit for holding an output of said second A/D conversion circuit, a switching circuit for selecting an output of said first video memory circuit or an output of said second video memory circuit, a D/A conversion circuit for converting an output of said switching circuit into an analog signal, a first PLL circuit for supplying a first clock signal which is synchronous with a horizontal sync signal of the first received video signal to said first A/D conversion circuit, a second PLL circuit for supplying a second clock signal to said D/A conversion circuit, a third PLL circuit for supplying a third clock signal which is synchronous with a horizontal sync signal of the second received video signal to said second A/D conversion circuit, a sync generation circuit for producing horizontal and vertical sync pulses from the second clock signal of said second PLL circuit and providing the sync pulses to said deflection circuit of said display apparatus, a timing control circuit for controlling timing of at least predetermined respective circuits of said conversion means, a signal identification circuit for producing identification information for each received video signal for said timing control circuit, and a deflection control circuit for producing control signals for deflection size and deflection position of a displayed image from an output of said signal identification circuit and for providing the control signals to said deflection circuit of said display apparatus.

16. A display apparatus according to claim 15, wherein said first video memory circuit and said second video memory circuit each include a frame memory circuit.

17. A display apparatus for receiving video signals which differ in scanning frequencies or resolutions, comprising:

a receiver capable of receiving any of a plurality of predetermined video signals differing in scanning frequencies or resolutions;

a multi-frequency/resolution conversion circuit for converting at least one of a horizontal scanning frequency and a vertical scanning frequency of a received video signal from said receiver so as to be within predetermined higher ranges without decreasing a horizontal resolution of said received video signal and without changing a vertical display resolution of said received video signal, said multi-frequency/resolution conversion circuit being capable of selectably converting at least two different video signals of said predetermined video signals differing in scanning frequencies or resolutions; and a display for displaying a converted said received video signal, said display including a drive circuit operating within the predetermined higher ranges.

18. A display apparatus for receiving video signals which differ in scanning frequencies or resolutions, comprising:

means for receiving at least one video signal;

a conversion circuit for converting at least one of a horizontal scanning frequency and a vertical scanning frequency of the received at least one video signal so as to be within predetermined higher ranges thereof, inserting blanking lines in a vertical blanking period of the received at least one video signal, thereby increasing a number of scanning lines of the received at least one video signal, and generating a size controlling signal for controlling a size of a video image displayed on a display screen in response to the increased number of scanning lines of the received at least one video signal; and display means including a display screen for displaying the converted received at least one video signal as a video image, and a drive circuit operating within the predetermined higher ranges for driving the display screen of the display means and controlling a size of the video image displayed on the display screen in response to the size controlling signal.

19. A display apparatus comprising:

means for receiving at least one video signal;

up-conversion means for up-converting at least one of a horizontal scanning frequency and a vertical scanning frequency of the received at least one video signal;

a switching circuit for receiving the received at least one video signal and the converted received at least one video signal, and selectively outputting one of the received at least one video signal and the converted received at least one video signal in accordance with at least one of the horizontal scanning frequency and the vertical scanning frequency of the received at least one video signal; and display means for displaying the one of the received at least one video signal and the converted received at least one video signal selectively outputted from the switching circuit.

20. A display apparatus for receiving video signals which differ in scanning frequencies or resolutions, comprising:

a video circuit capable of receiving any of a plurality of predetermined video signals which differ in scanning frequencies or resolutions;

a multi-frequency/resolution conversion circuit for converting at least one of a scanning frequency and a horizontal resolution of a received video signal so as to be within predetermined higher ranges without changing a vertical display resolution of said received video signal, said multi-frequency/resolution conversion circuit being capable of selectably converting at least two different video signals of said predetermined video signals differing in scanning frequencies or resolutions; and a display portion for displaying a converted said received video signal.

21. A display apparatus for receiving video signals which differ in scanning frequencies or resolutions, comprising:

a receiver capable of receiving any of a plurality of predetermined video signals differing in scanning frequencies or resolutions;

a converter for converting at least one of a scanning frequency and a horizontal resolution of a received video signal from said receiver so as to be within predetermined higher ranges without changing a vertical display resolution of said received video signal, said converter including a plurality of different predetermined conversion factors each for converting different said predetermined video signals differing in scanning frequencies or resolutions; and a display for displaying a converted said received video signal from said converter.

22. A display apparatus for receiving video signals which differ in scanning frequencies or resolutions, comprising:

a display including a deflection circuit controllable for deflection size and deflection position of a displayed image by control signals;

a receiver capable of receiving any of a plurality of predetermined video signals differing in scanning frequencies or resolutions; and a converter for converting at least one of a scanning frequency and resolution of a received video signal from said receiver so as to be within predetermined higher ranges and within receivable ranges of said display, said converter including a plurality of different predetermined conversion factors each for converting different said predetermined video signals differing in scanning frequencies or resolutions, and including a control signal generator for providing said control signals to said deflection circuit so as to control an aspect ratio of said display.

23. A display apparatus for receiving video signals which differ in scanning frequencies or resolutions, comprising:

a receiver capable of receiving any of a plurality of predetermined video signals differing in scanning frequencies or resolutions;

a conversion circuit for converting at least one of a horizontal scanning frequency and a vertical scanning frequency of a received video signal from said receiver so as to be within predetermined higher ranges without decreasing a horizontal resolution of said received video signal and without changing a vertical display resolution of said received video signal, said conversion circuit including a plurality of different predetermined conversion factors each for converting different said predetermined video signals differing in scanning frequencies or resolutions; and a display for displaying a converted said received video signal, said display including a drive circuit operating within the predetermined higher ranges.

24. A display apparatus for receiving video signals which differ in scanning frequencies or resolutions, comprising:
- a video circuit capable of receiving any of a plurality of predetermined video signals which differ in scanning frequencies or resolutions;
- a conversion circuit for converting at least one of a scanning frequency and a horizontal resolution of a received video signal so as to be within predetermined higher ranges without changing a vertical display resolution of said received video signal, said conversion circuit including a plurality of different predetermined conversion factors each for converting different said predetermined video signals differing in scanning frequencies or resolutions; and
- a display portion for displaying a converted said received video signal.

25. A display apparatus according to claim 21, wherein said display is more particularly a multi-sync computer monitor.

26. A display apparatus according to claim 22, wherein said display is more particularly a multi-sync computer monitor.

27. A display apparatus according to claim 23, wherein said display is more particularly a multi-sync computer monitor.

28. A display apparatus according to claim 24, wherein said display portion is more particularly a multi-sync computer monitor.

29. A display apparatus according to claim 21, wherein said plurality of different predetermined conversion factors are more particularly a plurality of different multiplication factors.

30. A display apparatus according to claim 22, wherein said plurality of different predetermined conversion factors are more particularly a plurality of different multiplication factors.

31. A display apparatus according to claim 23, wherein said plurality of different predetermined conversion factors are more particularly a plurality of different multiplication factors.

32. A display apparatus according to claim 24, wherein said plurality of different predetermined conversion factors are more particularly a plurality of different multiplication factors.

* * * * *